(12) United States Patent
Towley, III

(10) Patent No.: US 11,110,315 B2
(45) Date of Patent: Sep. 7, 2021

(54) KNOCK DOWN SELECTORIZED DUMBBELL HAVING FASTENER AND TOOL FREE ASSEMBLY OF NESTED WEIGHTS

(71) Applicant: PowerBlock Holdings, Inc., Owatonna, MN (US)

(72) Inventor: Carl K. Towley, III, Sebastian, FL (US)

(73) Assignee: PowerBlock Holdings, Inc., Owatonna, MN (US)

( * ) Notice: Subject to any disclaimer, the term of this patent is extended or adjusted under 35 U.S.C. 154(b) by 0 days.

(21) Appl. No.: 16/921,565

(22) Filed: Jul. 6, 2020

(65) Prior Publication Data

US 2021/0008403 A1 Jan. 14, 2021

Related U.S. Application Data

(63) Continuation of application No. 15/355,704, filed on Nov. 18, 2016, now Pat. No. 10,702,732.

(51) Int. Cl.
| | |
|---|---|
| *A63B 21/075* | (2006.01) |
| *B62J 9/22* | (2020.01) |
| *B62J 9/26* | (2020.01) |
| *A63B 21/00* | (2006.01) |
| *A41D 1/04* | (2006.01) |
| *A41D 3/00* | (2006.01) |
| *A63B 21/065* | (2006.01) |
| *A63B 21/072* | (2006.01) |
| *A41D 27/20* | (2006.01) |

(52) U.S. Cl.
CPC .............. *A63B 21/075* (2013.01); *A41D 1/04* (2013.01); *A41D 3/00* (2013.01); *A63B 21/065* (2013.01); *A63B 21/0726* (2013.01); *A63B 21/4007* (2015.10); *A63B 21/4035* (2015.10); *B62J 9/22* (2020.02); *B62J 9/26* (2020.02); *A41D 27/20* (2013.01)

(58) Field of Classification Search
CPC ........................................... A63B 21/072–075
See application file for complete search history.

(56) References Cited

U.S. PATENT DOCUMENTS 4,529,197 A * 7/1985 Gogarty ............. A63B 21/0728
482/107
4,997,184 A * 3/1991 Sherman ............ A63B 21/0602
482/108

(Continued)

*Primary Examiner* — Jennifer Robertson
(74) *Attorney, Agent, or Firm* — James W. Miller

(57) ABSTRACT

A selectorized dumbbell includes a horizontal stack of nested left weight plates and a horizontal stack of spaced right weight plates with the stacks being separated by a gap into which a handle may be inserted. A selector is movable into different positions relative to the handle to vary how many nested left and right weight plates from the stacks thereof are coupled to the handle to vary the exercise mass of the handle. Each left weight plate has a counterpart right weight plate counterpart which are coupled together by at least one interconnecting member having a first keyhole slot connection between the left end of the interconnecting member and the left weight plate and a second keyhole slot connection between the right end of the interconnecting member and the right weight plate.

1 Claim, 11 Drawing Sheets

(56) References Cited

U.S. PATENT DOCUMENTS

| | | | | |
|---|---|---|---|---|
| 2011/0028285 A1* | 2/2011 | Towley, III | ........ | A63B 21/0728 482/108 |
| 2012/0264575 A1* | 10/2012 | Towley, III | ........ | A63B 21/0726 482/107 |

* cited by examiner

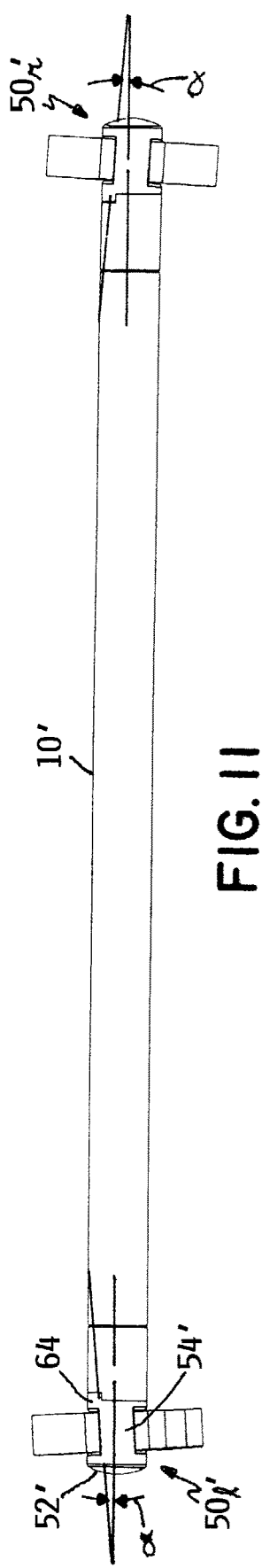
FIG. 11
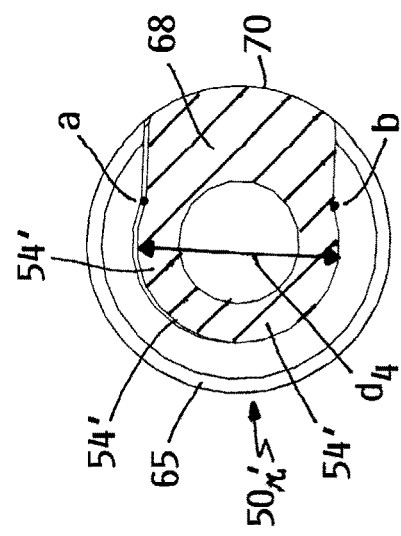
FIG. 13
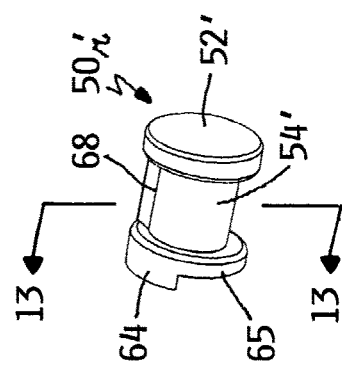
FIG. 12
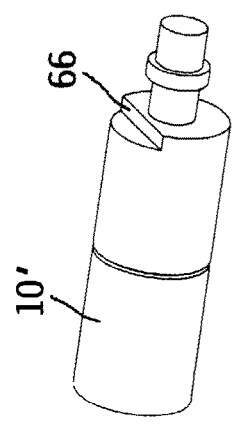

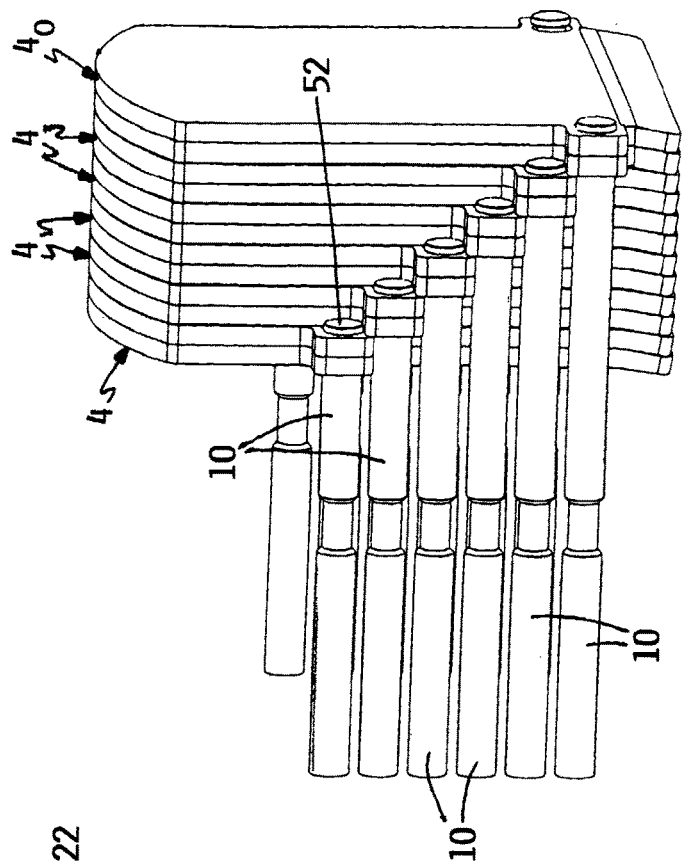
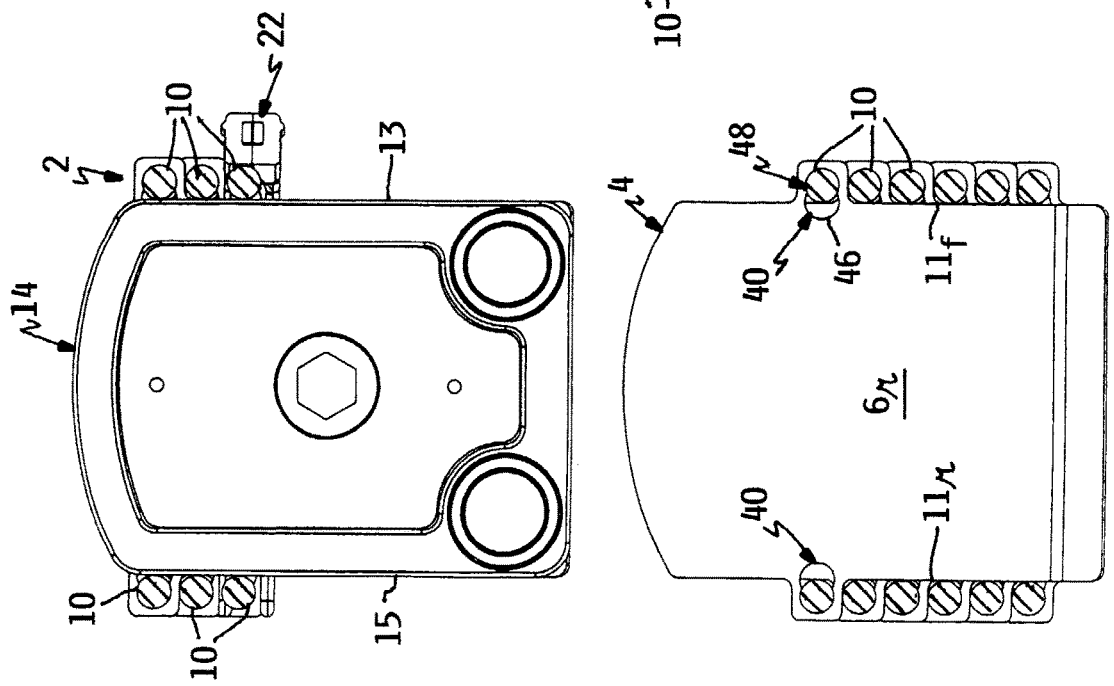
FIG. 18
FIG. 19

KNOCK DOWN SELECTORIZED DUMBBELL HAVING FASTENER AND TOOL FREE ASSEMBLY OF NESTED WEIGHTS

TECHNICAL FIELD

This invention relates to exercise equipment and, more particularly, to a selectorized dumbbell that permits easy adjustment of the overall exercise mass provided by the dumbbell.

BACKGROUND OF THE INVENTION

Selectorized dumbbells are well known in the exercise equipment art for allowing a user to quickly and easily adjust the exercise mass of the dumbbell rather than having to rely on a set of dumbbells that are individually non-adjustable but each provide a different exercise mass. For example, rather than having to purchase and store a set of ten different dumbbells to provide a user with the ability to pick an exercise mass that starts at five pounds and ends at fifty pounds in five pound increments, a user can purchase and store a single selectorized dumbbell to accomplish the same functionality. The exercise mass of the selectorized dumbbell is adjusted by a selector that cooperates with the handle of the dumbbell with the selector being adjusted relative to the handle by the user to selectively couple different numbers of weights to the handle. If the user wishes a lighter exercise mass, the user adjusts the selector in a manner that couples fewer weights to the handle. If the user wishes a heavier exercise mass, the user correspondingly adjusts the selector in a manner that couples a greater number of weights to the handle.

The PowerBlock® selectorized dumbbell, manufactured and sold by PowerBlock, Inc. of Owatonna, Minn., uses a series of nested exercise weights in which each weight comprises a left weight plate and a right weight plate which are spaced apart from one another but which are joined to one another to form a single weight by a front rail and a rear rail extending between and fixedly fastened to front and rear sides of the weight plates. Each weight in the series of weights have the weight plates spaced apart at progressively larger distances beginning with an innermost weight that is nearest to the handle and an outermost weight that is furthest from the handle. The front and rear rails in each weight are progressively longer to take into account the progressively increasing distances between the weight plates of the different weights. In addition, the rails are attached at progressively lower heights on the weights beginning with the innermost weight and ending with the outermost weight. Thus, the weights can be nested together in a compact assembly forming a set of nested left weight plates disposed adjacent the left end of the handle, a set of nested right weight plates disposed adjacent the right end of the handle, and with the handle capable of being dropped down into the gap that is formed between the sets of nested left and right weight plates. U.S. Pat. Nos. 7,335,142, 7,387,696 and 7,857,735 illustrate the above described structure of the PowerBlock® selectorized dumbbell.

The rails in each weight of the series of nested weights used in the PowerBlock® selectorized dumbbell have been attached to the front and rear sides of the weight plates in different ways in different models of the dumbbell. In some models, the rails are welded to the front and rear sides of the weight plates. In other models, the front and rear sides of the weight plates contain outwardly projecting lugs with the ends of the rails being bolted by threaded fasteners to such lugs. In this bolted attachment model, the fasteners require a high degree of torque and precision to drive them in properly such that the fastening of the rails to the lugs is done at the factory as part of the overall manufacturing process to ensure quality. As a result, the completed dumbbell is shipped in an assembled form with the different weights being disposed in their nested configuration and with the handle being dropped down into the gap between the spaced sets of nested left and right weight plates. This requires a carton, shipping package or crate large enough to envelop the assembled dumbbell such that the dumbbell is not easily transportable by an end user once the end user removes the dumbbell from its original shipping enclosure and disposes of such enclosure.

Thus, there is a need in the art to provide a knock down form of this type of selectorized dumbbell including a way of easily disassembling and reassembling the weight plates and the rails in each of the nested weights and in more easily carrying the components of the dumbbell from place to place if the end user desires to do so. This invention is directed to satisfying such need.

SUMMARY OF THE INVENTION

One aspect of this invention relates to a selectorized dumbbell which comprises a plurality of nested exercise weights, a handle, and a selector that is selectively adjustable on the handle to couple different numbers of exercise weights to the handle to vary the exercise mass provided by the dumbbell. Each weight in the plurality of weights comprises left and right weight plates which are spaced apart from one another but which are joined to one another to form a single weight by at least one interconnecting member extending between and being attached to the weight plates. The weight plates and the at least one interconnecting member of each weight are separate and distinct from the weight plates and the at least one interconnecting member of the other weights. Each weight has a releasable connection between each of the left and right weight plates and opposite ends of the at least one interconnecting member for attaching the left and right weight plates to the at least one interconnecting member. Each connection comprises an opening formed in the each of the left and right weight plates, the opening comprising at least first and second contiguous and interconnected portions. Each connection further comprises each end of the at least one interconnecting member being shaped to be capable of being freely inserted into the first portion of the opening in a first insertion direction and to be then subsequently moved within the second portion of the opening in a second securement direction that is different than the first direction to secure the at least one interconnecting member and the left and right weight plates together.

Another aspect of this invention relates to a selectorized dumbbell which comprises a horizontal stack of nested left weight plates and a horizontal stack of spaced right weight plates with the stacks being separated by a gap into which a handle may be inserted. A selector is movable into different positions relative to the handle to vary how many nested left and right weight plates from the stacks thereof are coupled to the handle to vary the exercise mass of the handle. Each left weight plate has a counterpart right weight plate which are coupled together by at least one interconnecting member having a first keyhole slot connection between the left end of the interconnecting member and the left weight plate and a second keyhole slot connection between the right end of the interconnecting member and the right weight plate.

A further aspect of this invention is a method of using a selectorized dumbbell for both aerobic and anaerobic exercise which comprises providing a selectorized dumbbell having a handle, a plurality of nested weights, and a selector that is selectively movable by a user into different positions relative to the handle to vary how many nested weights are coupled to the handle to thereby vary an exercise mass provided by the dumbbell. The handle, weights and selector have both an assembled condition and a disassembled condition. The handle, weights and selector interact with one another in the assembled condition to be capable of functioning as a dumbbell for use in anaerobic exercise. The handle, weights and selector are separate from and unconnected to one another in the disassembled condition to be incapable of functioning as a dumbbell for use in anaerobic exercise. The method further comprises providing a garment having storage pockets for storing the handle, weights and selector of the dumbbell when the dumbbell is in the disassembled condition, having a user employ the dumbbell when in the assembled condition thereof to perform anaerobic exercise, placing the handle, weights and selector of the dumbbell when the dumbbell is in the disassembled condition into the storage pockets of the garment, having a user don the garment carrying the handle, weights and selector of the dumbbell, and then having the user perform aerobic exercise while wearing the garment such that the benefit of the aerobic exercise is enhanced by the mass added to the garment by the handle, weights and selector of the dumbbell.

Yet another aspect of this invention is a method of using a selectorized dumbbell for both aerobic and anaerobic exercise which comprises providing a selectorized dumbbell of the type set forth in the previous paragraph hereof. The method further comprises providing a user powered vehicle having storage pockets for storing at least some of the weights of the dumbbell when the dumbbell is in the disassembled condition, having the user employ the dumbbell when in the assembled condition thereof to perform anaerobic exercise, and placing the at least some of the weights of the dumbbell when the dumbbell is in the disassembled condition into the storage pockets of the vehicle, and then having the user perform aerobic exercise by propelling the vehicle such that the benefit of the aerobic exercise is enhanced by the mass added to the vehicle by the at least some of the weights of the dumbbell.

An additional aspect of this invention comprises providing a selectorized dumbbell in custom made lengths. The method comprises providing a selectorized dumbbell which comprises a plurality of nested exercise weights, each weight in the plurality of weights comprising left and right weight plates which are spaced apart from one another but which are joined to one another to form a single weight by at least one interconnecting member extending between and being attached to the weight plates, the weight plates and the at least one interconnecting member of each weight being separate and distinct from the weight plates and the at least one interconnecting member of the other weights. Each weight has a releasable connection between each of the left and right weight plates and opposite ends of the at least one interconnecting member for attaching the left and right weight plates to the at least one interconnecting member to permit the weights to be disassembled into a plurality of weight plates and interconnecting members that are capable of being disconnected from one another. The dumbbell further comprises a handle comprising a hand grip releasably connecting left and right handle ends to permit the handle to be disassembled into disconnected handle ends and hand grip and a selector that is adjustable on the handle to couple different numbers of exercise weights to the handle to vary the exercise mass provided by the dumbbell. The method further comprises providing dumbbells of different lengths having weight plates and handle ends that are common to each dumbbell but also having hand grip lengths, selector widths and sets of interconnecting members that are unique to each dumbbell according to the length of each dumbbell.

BRIEF DESCRIPTION OF THE DRAWINGS

This invention will be described more fully in the Detailed Description, when taken in conjunction with the following drawings, in which like reference numerals to refer to like elements throughout.

FIG. 11 is a front elevational view, partially in cross section, of a portion of the alternate weight shown in FIG. 9, particularly illustrating the mirror image, angled orientations of the body of the connector tips at opposite ends of a connecting rail with such angled orientations providing the vertically angled orientation of the weight plates;

FIG. 12 is a perspective and exploded view of a portion of the alternate weight shown in FIG. 9, particularly illustrating one end of the one of the connecting rails and the associated connector tip therefor;

FIG. 13 is a cross-sectional view through one of the connector tips taken along lines 13-13 in FIG. 12;

FIG. 18 is a cross-sectional view in side elevation of the selectorized dumbbell of FIG. 1 taken along lines 18-18 of FIG. 8; and FIG. 19 is a perspective view of a portion of the six unused weights that are depicted in FIGS. 8 and 18 as remaining in their stacked nested configuration.

DETAILED DESCRIPTION

Figure 1:
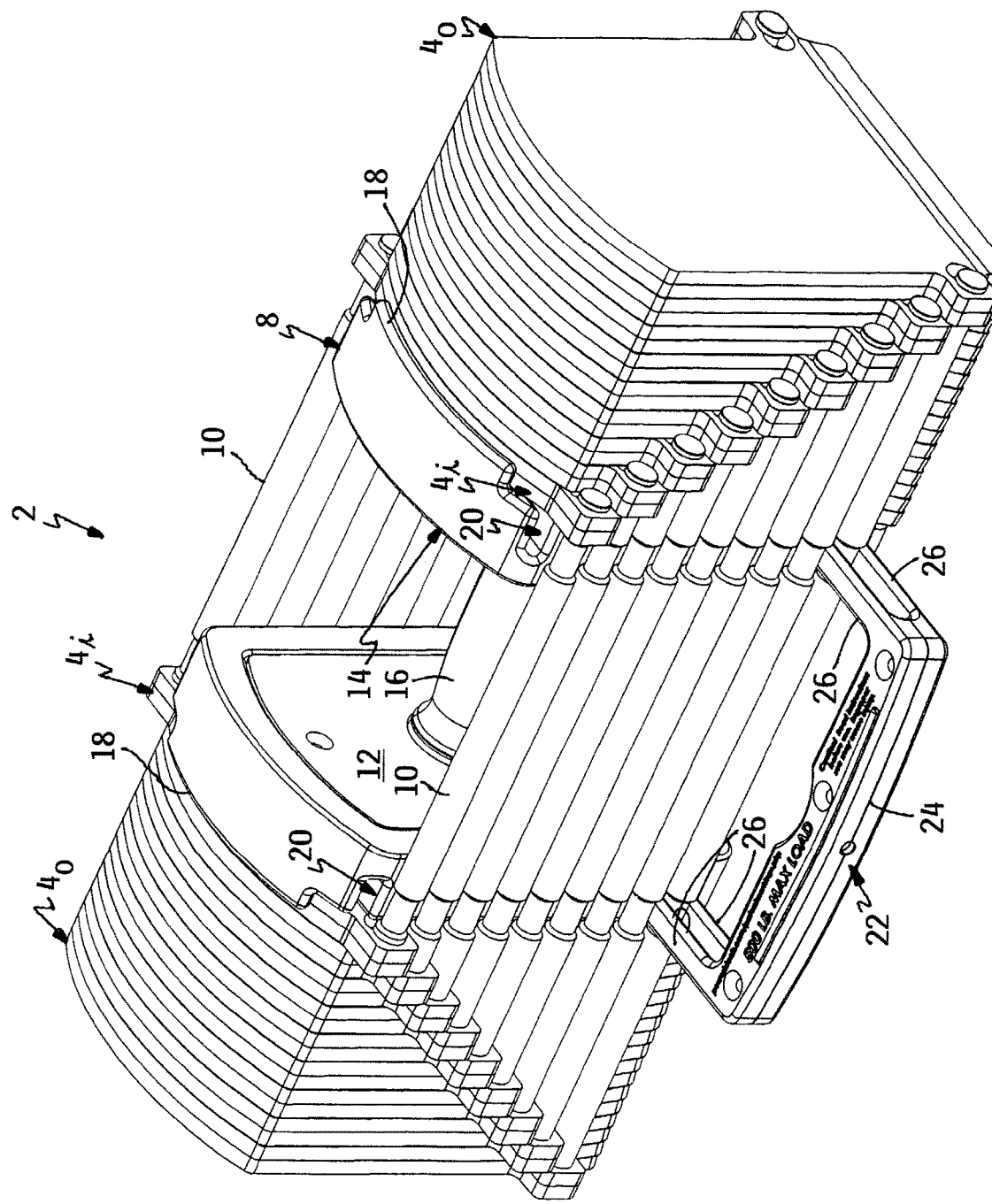
FIG. 1 is a perspective view of one embodiment of a selectorized dumbbell according to this invention.

One embodiment of a selectorized dumbbell according to this invention is illustrated generally as 2 in FIG. 1. Dumbbell 2 is similar to that shown in the Applicant's U.S. Pat. No. 7,857,735, which is hereby incorporated by reference. Only those features of dumbbell 2 which relate to this invention will be described in detail herein. The materials incorporated by reference above can supply other information regarding the general structure and operation of dumbbell 2.

Figure 2:
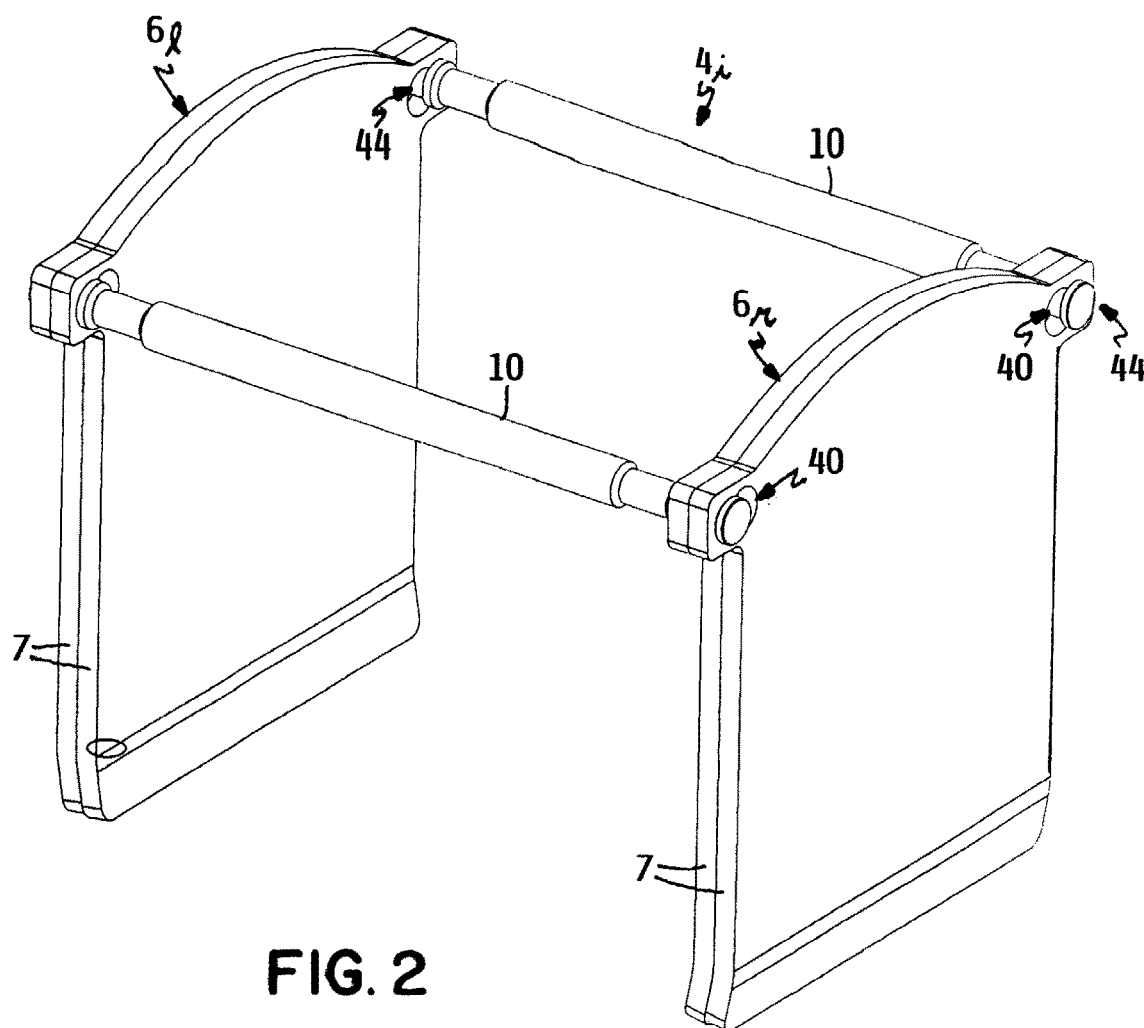
FIG. 2 is a perspective view of the innermost exercise weight of the selectorized dumbbell of FIG. 1, particularly showing such weight in a fully assembled form in which the left and right laterally spaced weight plates have been rigidly connected together along the front and rear sides thereof by front and rear connecting members in the form of elongated front and rear connecting rails.

By way of a brief overview, dumbbell 2 is illustrated in FIG. 1 as having nine weights 4 nested in an array beginning with an innermost weight $4_i$ that is closest to a handle 8, ending with an outermost weight $4_o$ that is furthest from handle 8, and containing seven other weights 4 progressively arranged between innermost weight $4_i$ and outermost weight $4_o$. As shown in FIG. 2 which illustrates innermost weight $4_i$, each weight 4 comprises a left weight plate $6_l$, a right weight plate $6_r$ that is laterally spaced from left weight plate $6_l$, and front and rear elongated connecting members or rails 10 that join left and right weight plates $6_l$ and $6_r$ together as a unit along the front and rear sides of weight plates $6_l$ and $6_r$. Weight plates $6_l$ and $6_r$ are preferably made from metal, such as steel.

In one embodiment thereof as shown in FIGS. 1 and 2, weight plates $6_l$ and $6_r$ are each made from two thinner sub-plates 7 that are separate from one another, that are overlaid against each other to have their facing surfaces abut with one another, and that are held together in this relationship when such sub-plates 7 are connected to one end of one of rails 10 as described hereafter. Rather, than being separate from each other, sub-plates 7 could be welded or otherwise fixed together when manufacturing each weight plate $6_l$ and $6_r$ as taught in the Applicant's prior U.S. Pat. No. 7,335,142, which is also incorporated by reference herein. Alternatively, weight plates $6_l$ and $6_r$ could each be made from more than two even thinner sub-plates 7 or could each comprise a single, unitary plate that alone has the desired thickness for weight plates $6_l$ and $6_r$.

Referring again to FIG. 1, each weight 4 that is outside of innermost weight $4_i$ has progressively increased spacing between left and right weight plates $6_l$ and $6_r$ which requires progressively increased lengths of front and rear connecting rails 10. In addition, each weight 4 that is outside of innermost weight $4_i$ locates front and rear connecting rails 10 at progressively lower elevations such that the elevation of rails 10 of innermost weight $4_i$ are highest, the elevation of rails 10 of outermost weight $4_o$ are lowest, and the elevation of rails 10 of all the other weights 4 progressively fill in the vertical space between the highest and lowest rails 10. This allows weights 4 to be compactly nested together in an elongated block type shape with all the left weight plates $6_l$ being nested together in a stack that is separated by a large lateral gap from a corresponding stack of nested right weight plates $6_r$.

Handle 8 has a left end 12, a right end 14, and an elongated hand grip 16 that joins handle ends 12 and 14 together. The distance between the outside surfaces of handle ends 12 and 14 is arranged to allow handle 8 to be dropped down into the gap between the laterally spaced stacks of nested left weight plates $6_l$ and right weight plates $6_r$. If so desired, left and right handle ends 12 and 14 may have an upper, outwardly extending lip 18 that rests atop the left and right weight plates $6_l$ and $6_r$ of innermost weight $4_i$ when handle 8 is fully and properly inserted into the gap between the laterally spaced stacks of nested left weight plates $6_l$ and right weight plates $6_r$. In addition, the outside surfaces of handle ends 12 and 14 each carry a vertical array of identical, vertically spaced slots 20 that extend horizontally across the width of handle 8 between the front and back sides of handle 8. The uppermost slot 20 in each vertical array of slots 20 on handle ends 12 and 14 is visible in FIG. 1 with the rest of such slots 20 being on obscured by front rails 10.

A U-shaped weight selector 22 is shown in a mostly but not fully installed position in FIG. 1. Selector 22 has a grip 24 and horizontally extending connecting prongs 26 that project to one side from grip 24. Each side of grip 24 includes two upper and lower connecting prongs 26 that are vertically spaced from one another much like the tines of a tuning fork. Connecting prongs 26 may be rigid or flexible. The vertical spacing between the upper and lower connecting prongs 26 matches the vertical spacing of slots 20 so that upper prong 20 slides into a slot 20 that is immediately above any selected front rail 10 while lower prong 26 slides into a slot 20 that is immediately below the same selected front rail 10 such that prongs 26 in effect straddle the selected front rail 10. Connecting prongs 26 are long enough to span the distance between the front and rear rails 10 and to straddle the rear rail 10 on the rear side of dumbbell 2 that corresponds to the selected front rail 10.

The position of selector 22 within the vertical arrays of front and rear rails 10 determines how many nested weights 4 are coupled to handle 8. When selector 22 is beneath the lowermost rails 10 of outermost weight $4_o$ as shown in FIG. 1, dumbbell 2 has its maximum exercise mass as all of weights 4 will be lifted upwardly when the user grips hand grip 16 and lifts up on handle 8. By moving selector 22 progressively upwardly within the vertical arrays of front and rear rails 10 to straddle progressively higher rails 10, the exercise mass of dumbbell would be progressively decreased since one fewer weight 4 is coupled to handle 8 as each set of higher rails 10 is progressively straddled by selector 20. Thus, a user varies the exercise mass of dumbbell 2 by choosing where in the vertical arrays of front and rear rails 10 he or she inserts selector 22. Selector 22 could be provided with only one connecting prong 26 on opposite sides of grip 24 with such single connecting prong being slid into slots 20 that are beneath the selected rail 10.

The above-described overview is directed to various features of PowerBlock selectorized dumbbells that are already known in the exercise equipment art except for the above-described feature of sub-plates 7 being separate from one another without being fixed to one another. This invention is directed to a novel connection between the left and right weight plates $6_l$ and $6_r$ and the front and rear rails 10 of each weight 4 that permits such components to be quickly and easily assembled by an end user without the need for tools. In addition, handle 8 can be quickly and easily disassembled without the need for tools by using threaded shanks 28 on opposite ends of hand grip 16 with shanks 28 being received in threaded bores 30 in left and right handle ends 12 and 14. See FIG. 7. This permits handle 8 to also be broken or knocked down into its individual components with the user simply having to spin or thread the handle ends 12 and 14 in a first direction onto their respective shanks 28 provided on hand grip 16 until the threaded connections between them are tight to assemble handle 8 or to spin or thread them in the opposite direction to release the threaded connections to disassemble handle 8.

Figure 7:
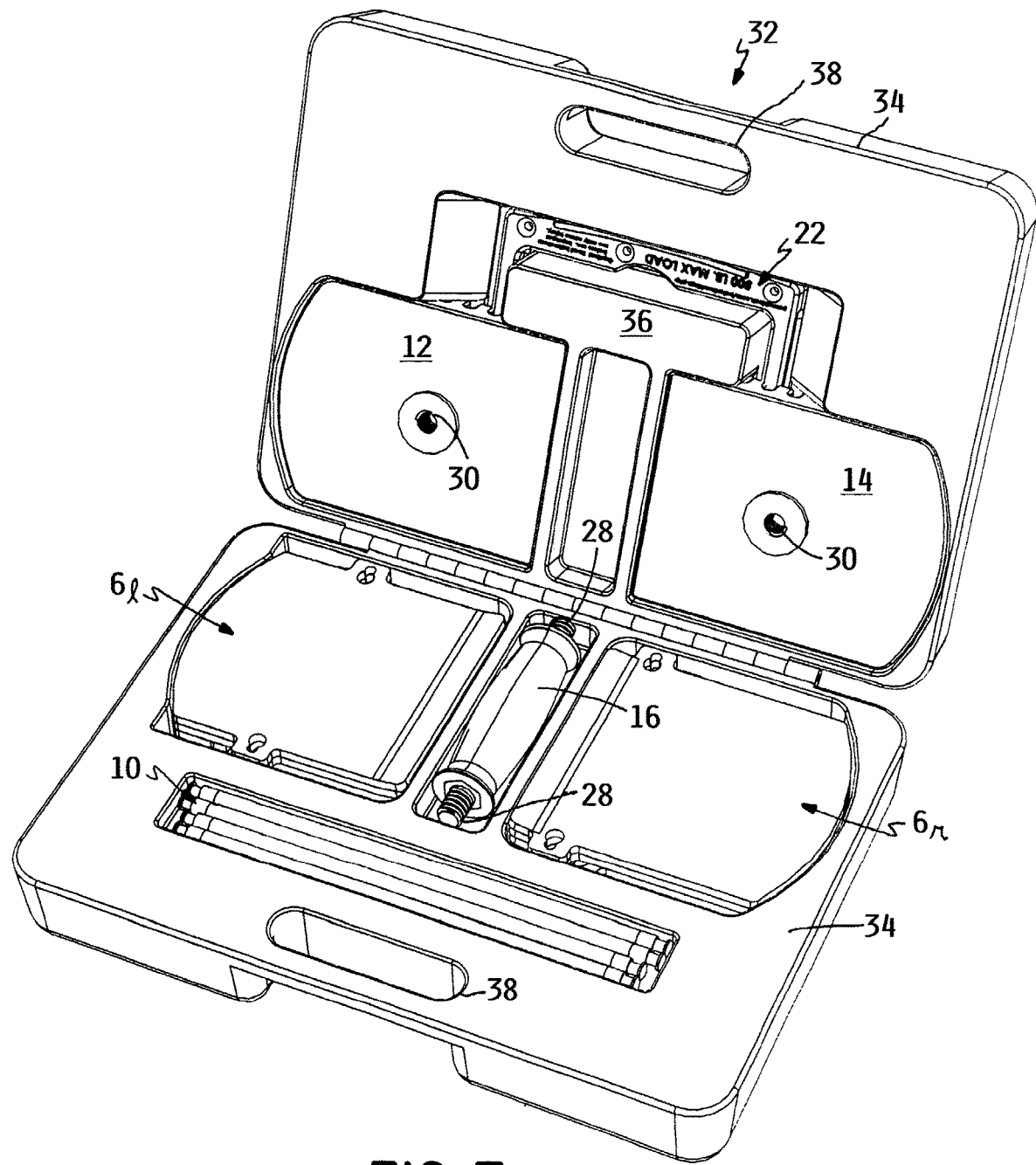
FIG. 7 shows the selectorized dumbbell of FIG. 1 in a knocked-down form with the disassembled components thereof being stored within a carrying and storage case.

The ability to knock down weights 4 and handle 8 into their individual components allows packaging all the components of dumbbell 2 in a single convenient, briefcase type case 32 as shown in FIG. 7. Such a case 32 has pivotally connected halves 34 that are shown in FIG. 7 in an open state. Various recesses are provided within each case half 34 for receiving the various components. For example, one case half could have four recesses with a first recess holding all of the front and rear rails 10, a second recess holding all the left weight plates $4_l$, a third recess holding all the right weight plates $4_r$, and a fourth recess holding hand grip 16 of handle 8. The other case half could have a single large recess with a center T-shaped central divider 36 around which U-shaped selector 22 would first be dropped into the recess followed by laying handle ends 12 and 14 into other portions of the recess on top of selector 22. The case halves 34 could be pivoted shut and held in a closed state using some type of latch (not shown) to contain all the components of dumbbell 2. The case halves would preferably be molded of plastic and would include molded openings 38 in each case half 34 that would overlie one another when case 32 is closed to form a handle for convenient carrying of case 32 and dumbbell 2.

The use of a single case 32 as shown in FIG. 7 would facilitate original shipment of dumbbell 2 to an end user since dumbbell 2 would now have a flatter rectangular shape than its fully assembled block type shape with case 32 serving to better protect the components of dumbbell 2 from damage. To protect case 32 itself from scratches or other damage during shipment from a manufacturer, it would merely be necessary to enclose case 32 in some type of protective but lightweight outer cardboard container which container could also serve as a point of sale display advertisement showing dumbbell 2 and its features. After a consumer or other end user purchases dumbbell 2, the purchaser would simply remove and dispose of the outer container, but would retain case 2 for storage and transport of dumbbell 2 when so desired. This would provide the end user with the ability to more easily transport dumbbell 2 between different locations where he or she might wish to use dumbbell 2, yet quickly assemble and disassemble dumbbell 2 without the need for any tools when he or she wishes to use dumbbell 2.

Figure 3:
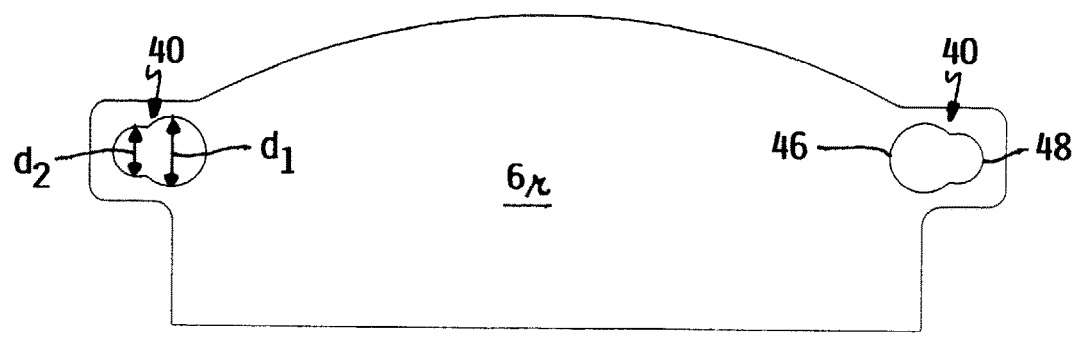
FIG. 3 is a side elevational view of a portion of one of the weight plates of the exercise weight of FIG. 2, particularly illustrating the keyhole slot connector provided in the front and rear sides of the weight plate.
Figure 4:
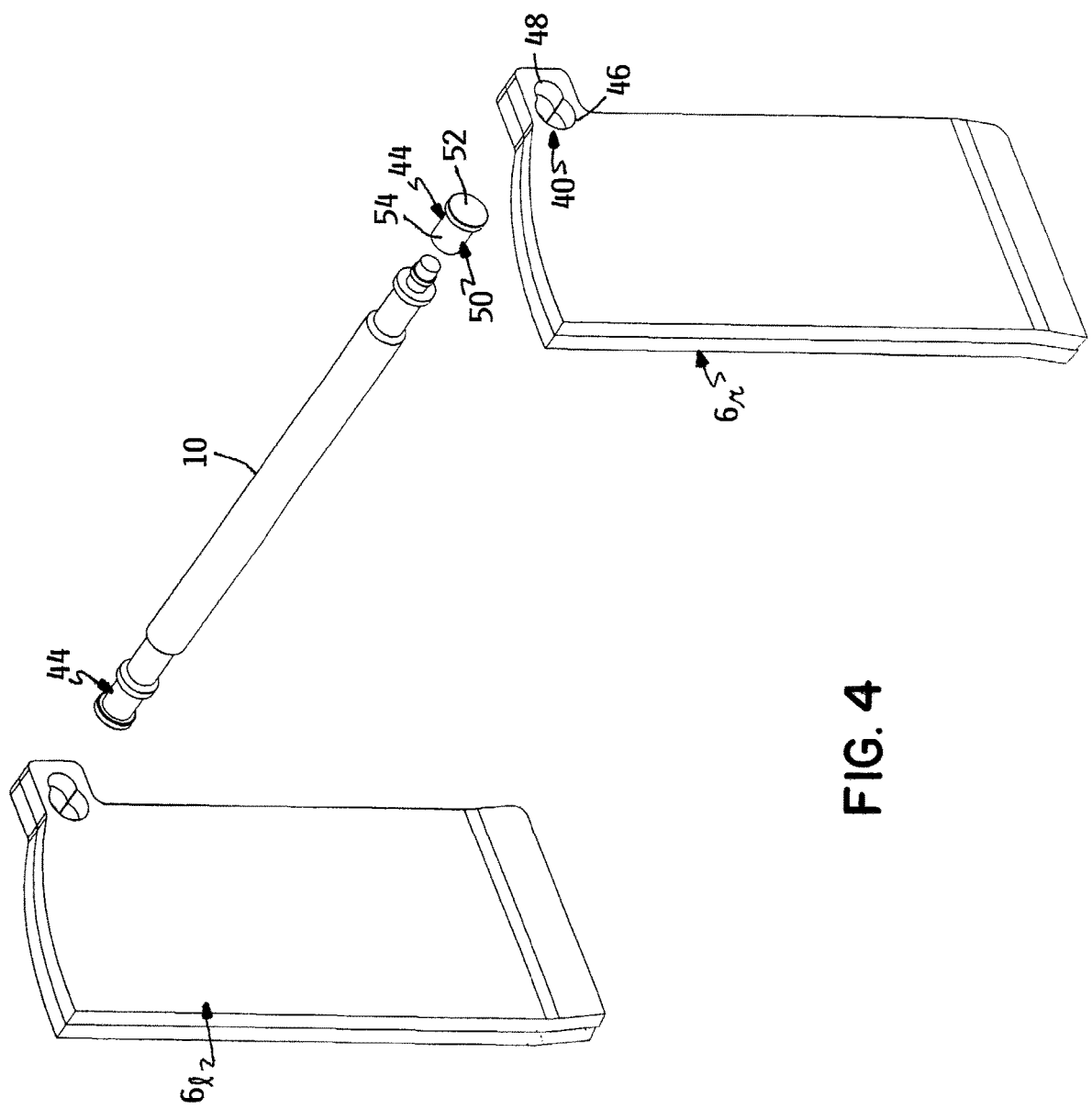
FIG. 4 is a partially broken away perspective view of the exercise weight of FIG. 2, particularly illustrating the rear connecting rail exploded away from the keyhole slot connectors in the spaced left and right weight plates with the connector tip on one end of the rail being shown exploded away from the rail.

Referring now to FIGS. 2-6, the innermost weight $4_i$ of dumbbell 2 will be referred to by way of example in order to explain how all weights 4 can be easily assembled from their individual components or disassembled into their individual components without the need for tools. As best shown in FIG. 3, left and right weight plates $6_l$ and $6_r$ of weight $4_i$ have a connection to opposite ends of rails 10 that involves an opening 40 formed in both the front and rear sides of each weight plate $6_l$ and $6_r$. Openings 40 are formed in short, outwardly extending tabs or lugs 42 that protrude forwardly and rearwardly, respectively, from the front and rear sides of each weight plate $6_l$ and $6_r$. Since innermost weight $4_i$ is being depicted in FIGS. 2-6, lugs 42 are located at the top of the front and rear sides of each weight plate $6_l$ and $6_r$. Referring to FIG. 1, lugs 42 on successive weights 4 that are outside of innermost weight $4_i$ are at successively lower elevations as one proceeds downwardly.

The connections that include openings 40 also include shaped ends 44 for opposite ends of each of the front and rear rails 10. Each rail end 44 is shaped to be capable of being freely inserted into a first portion 46 of opening 40 in a first insertion direction, indicated by the arrow I in FIG. 2, which is perpendicular to the plane of opening 40. Subsequent to such insertion, each rail end 44 is further shaped to be secured within a second portion 48 of opening when rail end 44 is moved relative to opening 40 in at least one second securement direction, indicated by the arrow S in FIG. 2, which is different from insertion direction I. Specifically, one embodiment of securement direction S is a linear direction lying within the plane of opening 40 at right angles to insertion direction I.

Figure 5:
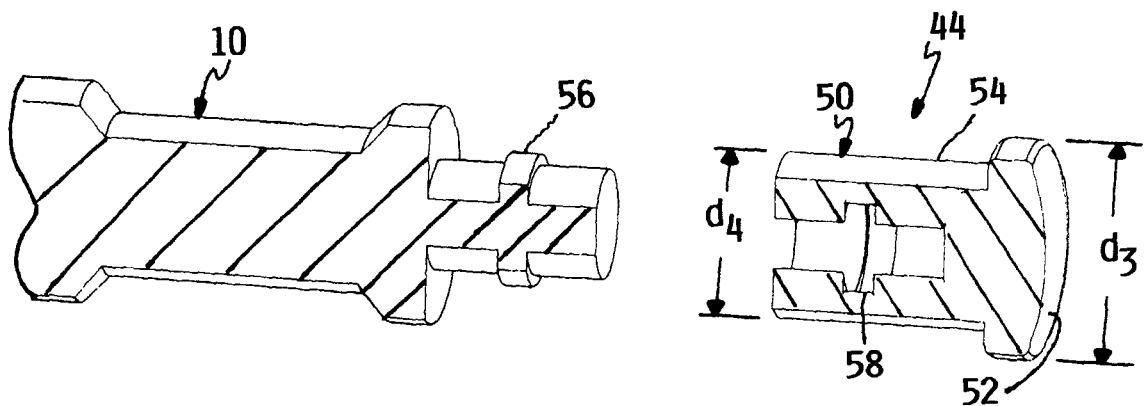
FIG. 5 is an enlarged cross-sectional view of one end of a front or rear connecting rail and the connector tip for that end of the connecting rail being exploded away therefrom prior to installation of the connector tip on the end of the connecting rail.

By way of example but not limitation, opening 40 as shown in FIGS. 2-6 may have a keyhole slot configuration in which first portion 46 of opening 40 comprises a partial portion of a circle having a diameter of $d_1$ and second portion 48 of opening 40 comprises an adjoining, contiguous and interconnected partial portion of a circle having a diameter $d_2$ that is smaller than diameter $d_1$. In this example, each shaped rail end 44 is in the form of an elongated tip 50 having an enlarged circular flange 52 that is located at one end of a cylindrical body 54. As shown in FIG. 5 which depicts an embodiment in which tip 50 is a separate piece that is affixed to each end of each rail 10, flange 52 of tip 50 has a diameter $d_3$ that is larger than the diameter $d_4$ of body 54. However, diameter $d_3$ of flange 52 is less than diameter $d_1$ of first portion 46 of opening 40. This allows tip 50 to be slid through first portion 46 of opening 40 in the insertion direction I with no interference from any portion of the boundary of second portion 48 of opening 40 due to where the first and second portions 46 and 48 of opening 40 join each other. Any portion of flange 52 that might have hit against any part of the boundary walls of second portion 48 lies along an arc that will miss such boundary walls and simply passes through first portion 46 and a small portion of the immediately adjoining open space of second portion 48. Thus, using a linear straight line push in insertion direction I when tip 50 is aligned with first portion 46 of opening 40, tip 50 comprising shaped rail end 44 will easily pass or slip through such first portion 46 until flange 52 of tip 50 is located immediately outboard of the weight plate $6_l$ or $6_r$ to which such rail is being connected.

Preferably though not necessarily, both shaped rail ends 44 of a single rail 10 are inserted through the first portions 46 of both openings 40 in the laterally spaced left and right weight plates $6_l$ and $6_r$ before the securement of rail 10 takes place. Once rail ends 44 have been inserted as described above, the user can grip rail 10 and pull rail 10 in the second securement direction S to force the cylindrical body 54 of each tip 50 into second portion 48 of each opening 40. Diameter $d_4$ of body 54 of tip 50 is preferably greater than diameter $d_2$ of second portion 48 of opening 40 and tip 50 is made of a resilient elastomeric material, such as urethane, which has the ability to compress to permit each tip 50 of rail 20 to move laterally outwardly into the smaller sized second portion 48 of opening 40. In one embodiment, a tip 50 having a diameter $d_4$ that is 5 to 10 thousandths of an inch greater than diameter $d_2$ of second portion 48 of opening 40 and a durometer within the range of 60 to 90 on the Shore A scale has been found to develop a force in tip 50 when tip 50 is received in second portion 48 of opening that is sufficient to non-movably secure rail 10 to weight plates $6_l$ and $6_r$ during ordinary use of dumbbell 2 by a user when the user is exercising. However, the retention force is nonetheless not strong enough to prevent the user from pulling rail 10 back out of the second portions 48 of openings 40 when it is desired to disassemble weight 4. Each rail 10 in each weight 40 will be similarly installed in lugs 42 provided therefor.

Referring further to FIG. 5, each rail 10, except for elastomeric tip 50, is formed of a suitably rigid and strong material, such as but not limited to steel that can be turned out of bar stock to form rail 10, that is capable of substantially rigidly holding left and right weight plates $6_l$ and $6_r$ of each weight 4 in their spaced apart relationship. However, urethane tips 50 will provide some shock resistance in the joints between rails 10 and the left and right weight plates $6_l$ and $6_r$ of each weight 4 to allow some flexing of weight plates $6_l$ and $6_r$ relative to their securing rails 10 to prevent damage to weights 4 in the event dumbbell 2 is inadvertently dropped onto the floor. Such shock resistance is generally taught in the prior art '735 patent incorporated by reference herein.

During the OEM manufacturing process of each rail 10, urethane tips 50 are preferably over molded onto each end of each rail 10 such that tips 50 are a permanent part of each rail 10 and are not intended to be removable therefrom. Tips 50 are shown separated from one end of rails 10 in FIGS. 4 and 5 only for the purpose of clarity in illustrating tips 50. In order to aid permanent retention of tips 50 on rails 10, the portion of each rail 10 that receives the over-molded tip 50 is formed with an annular outwardly projecting flange 56 which forms an annular recess 58 in tip 50 during the over molding process. See FIG. 5. Flange 56 and recess 58 form a cooperating thrust surface which helps permanently retain tip 50 on the end of rail 10 to which it has been over molded. While permanent retention of tips 50 on rails 10 is preferred, tips 50 could be removable therefrom if so desired to allow replacement in the case of any damage to tips 50.

The ability of a user to break down the individual weights 4 that comprise the set of nested weights that are used in conjunction with handle 8 provides a way for easily disassembling weights 4 for storage in case 32 so as to take up less space and/or to allow a user to transport dumbbell 2 in its disassembled form more easily for place to place, to then reassemble dumbbell 2 into its operative form at a new location, and to thereby use dumbbell 2 in multiple locations for exercise. This is enhanced by allowing handle 8 to break down into its left and right ends 12 and 14 and hand grip 16. Moreover, the fact that all such components can be reassembled into their operative forms without the need for tools is a further advantage. However, if so desired, hand grip 16 could be screwed or bolted to left and right ends 12 and 14, thus requiring a screwdriver which could be packaged within case 32, rather than having the user spin or thread the parts together by hand.

Figure 8:
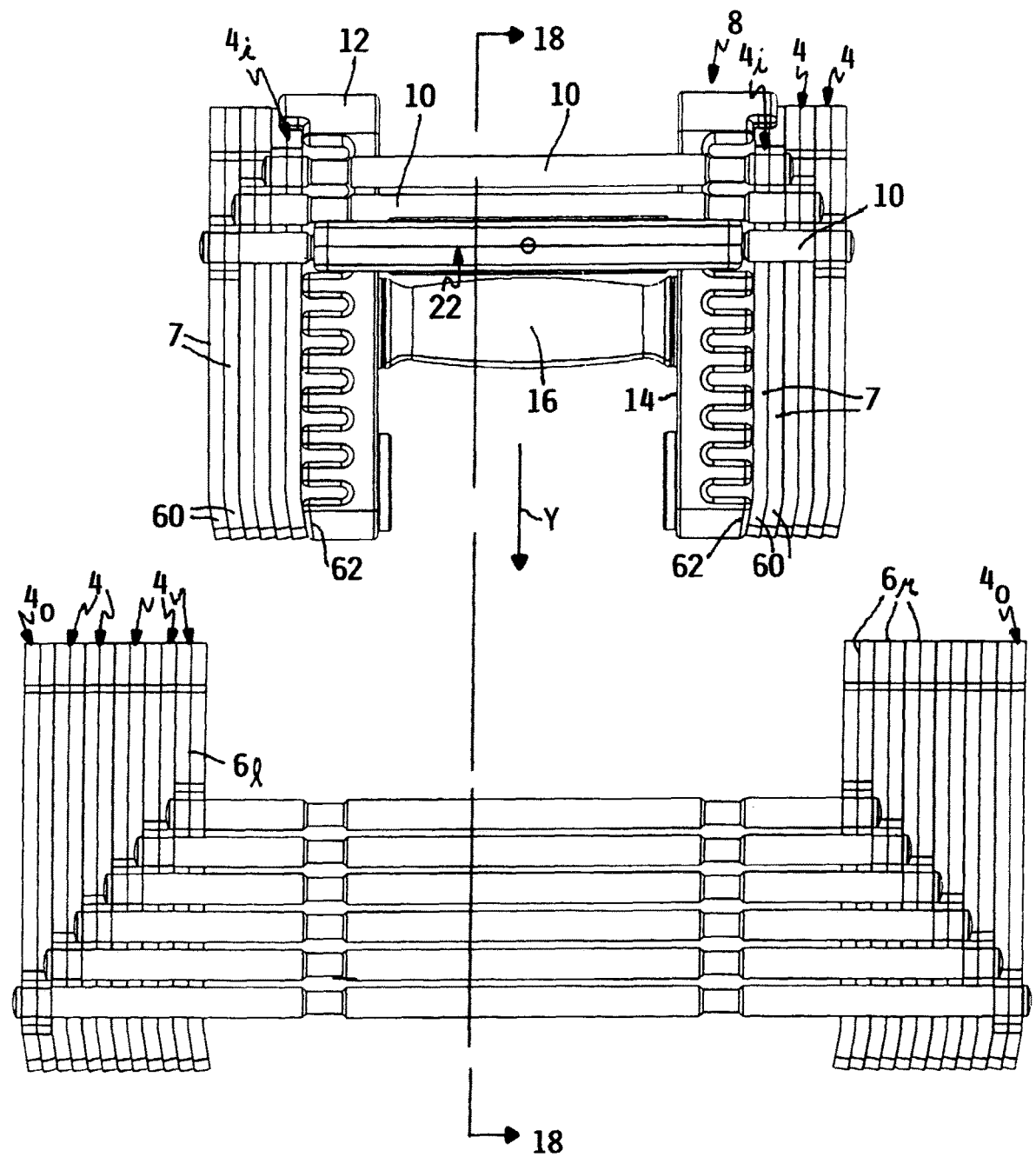
FIG. 8 is a side-elevational view of the selectorized dumbbell of FIG. 1, particularly illustrating the inwardly angled lower ends of the weights which facilitate the re-nesting of the handle and the selected weights with the remaining unselected portion of the weights.

Referring now to FIG. 8, dumbbell 2 is shown in use with the user having coupled the three innermost weights 4 to handle 8 by sliding selector 22 into handle 8 in a position where it picks up the lowermost rails 10 of the outermost of the three weights 4. The six other unused weights 4 are shown remaining in their stacked nested configuration. When the user completes his or her exercise and wishes to replace handle 8 and the three weights 4 carried thereby into the stack, the user roughly or generally aligns handle 8 with the gap between the stacks of left and right weight plates $6_l$ and $6_r$ and then lowers handle 8 into this gap as depicted by the arrow Y in FIG. 8. However, absolute precision in such alignment is not required since the lower ends of each weight 4, or more precisely the lower ends of whatever number of sub-plates 7 comprise each weight plate $6_l$ or $6_r$ when the weight plates are made from individual sub-plates rather than a single plate, are inwardly angled as shown at 60 in FIG. 8. The inwardly angled lower end or lower ends of that side of the outermost weight 4 carried by handle 8 that is misaligned with the gap so as to partially extend outwardly past the gap will engage the upper corner formed by the upper end of the innermost remaining weight 4 that is part of the remaining unused weights. This engagement will act to automatically cam or slide the handle 8 inwardly into full alignment with the gap as the user lowers handle 8 to ease the alignment burden on the user in reinserting handle 8 into the gap. Note that the lower ends of the left and right handle ends 14 and 16 have inwardly angled surfaces shown at 62 that match the slope of the inwardly angled lower ends 60 of weights 4 to permit the same camming action to occur if only the handle is being replaced in the gap between the nested left and right weight plates $6_l$ and $6_r$ and to further allow the inwardly angled lower ends 60 of innermost weight $4_l$ to mate smoothly against surfaces 62.

FIGS. 9-13 depict an alternate weight 4, identified as 4' that may be used in the plurality of weights that are associated with dumbbell 2 of FIGS. 1-8. To the extent the components of weight 4' are identical to or correspond generally with components of weight 4, they will be referred to using the same reference numerals associated with weight 4 but will include a prime suffix, e.g. weight 4' instead of weight 4, and the like. The relevant differences between weight 4' and weight 4 will now be described.

Figure 9:
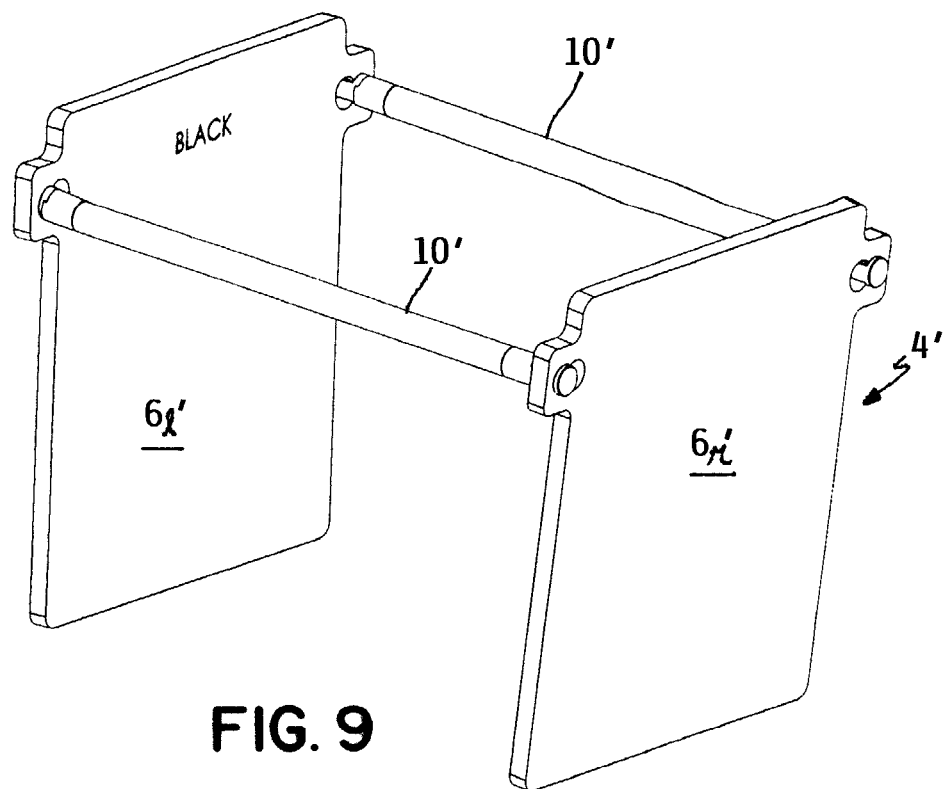
FIG. 9 is a perspective view of an alternate weight that may be used in conjunction with the dumbbell of FIG. 1, particularly illustrating weight plates which are flat from top to bottom and from front to back without having the inwardly angled lower ends of the weight plates as shown in FIG. 1.
Figure 10:
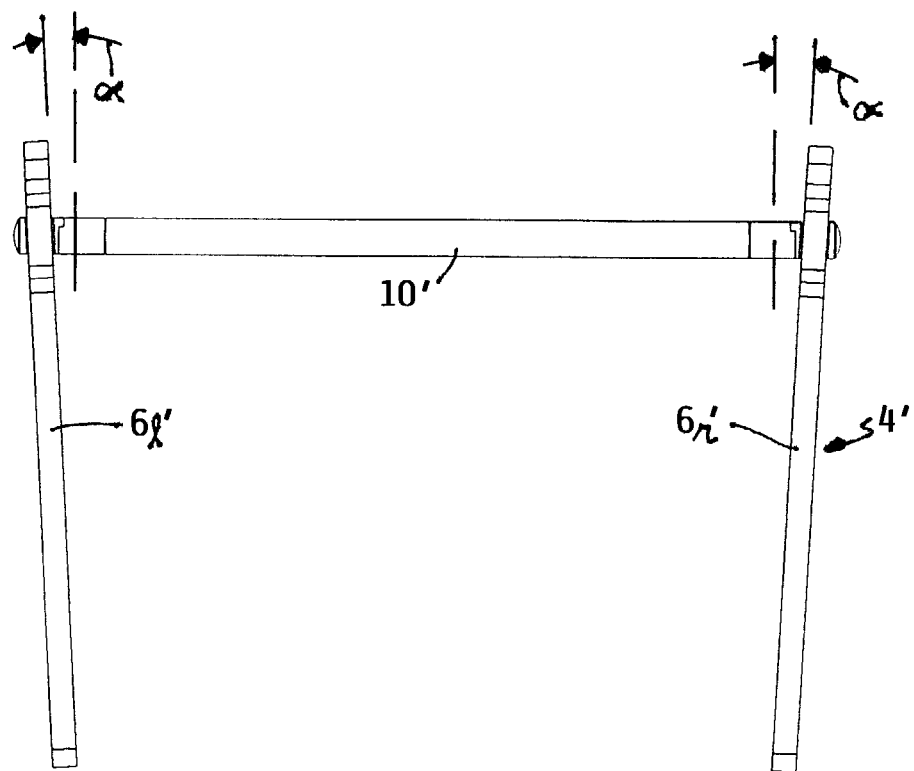
FIG. 10 is a front elevational view of the alternate weight shown in FIG. 9, particularly illustrating that the weight plates are slightly inwardly angled relative to vertical as the weight plates extend from top to bottom to help facilitate alignment when the handle and any weights carried thereby are being re-nested or reinserted into the gap between the stacks of the left and right weight plates of any unused weights.

Referring first to FIGS. 9 and 10, each weight 4' uses planar weight plates $6_l'$ and $6_r'$ that lack the inwardly angled lower ends 60 of weights 4. However, in order to facilitate alignment when a user attempts to reinsert handle 8 and any weights 4' carried thereby back into the gap between the stacks of nested left and right weight plates $6_l'$ and $6_r'$ of the unused weights 4', the left and right weight plates $6_l'$ and $6_r'$ of each weight 4' are slightly angled relative to vertical as indicated by the angles α in FIG. 10. With such inclination, the left and right weight plates $6_l'$ and $6_r'$ of each weight 4' angle inwardly as they extend downwardly. In other words, the distance between the lower ends of weight plates $6_l'$ and $6_r'$ is smaller than the distance between the upper ends of weight plates $6_l'$ and $6_r'$.

Thus, as the user lowers handle 8 and any weights 4' carried thereby towards the gap between the stacks of nested left and right weight plates $6_l'$ and $6_r'$ of the unused weights 4', the decreased distance between the lower ends of weight plates $6_l'$ and $6_r'$ of the outermost weight on handle 8 can, fairly easily and without the need for strict alignment, enter into the increased distance between the upper ends of weight plates $6_l'$ and $6_r'$ of the innermost weight in the unused weights. As the user continues to lower handle 8, the weight plates $6_l'$ and $6_r'$ of the outermost weight on handle 8 will eventually contact and begin to slide on the weight plates $6_l'$ and $6_r'$ of the innermost weight in the unused weights. This engagement will then cam or slide handle 8 in one direction or the other into full alignment with the gap. This alleviates the need for the user to exactly align handle 8 with the gap before attempting reinsertion.

The inward angling of weight plates $6_l'$ and $6_r'$ has been used in prior art PowerBlock® selectorized dumbbells of the Applicant for the alignment correction purpose described above, but is accomplished in a new and different way in weight 4' as disclosed herein—through a timed connector tip 50'. Two mirror image forms of connector tips 50' are needed to accomplish the desired result, namely a left connector tip $50_l'$ used on the left end of connecting rail 10' and a right connector tip $50_r'$ used on right the right end of connecting rail 10'. See FIG. 11. It is important to overmold or otherwise install the correct connector tip 50' on the correct end of connecting rail 10'. Therefore, as best shown in FIG. 12, each connector tip $50_l'$ and $50r'$ has an inwardly extending locating tab 64 on an upper portion of an inner circular flange 65. Tab 64 which sticks inwardly from flange 65 mates with and rests on top of a ledge 66 on each end of connecting rail 10' to signify that the correct connector tip 50' has been correctly affixed or installed to the correct end of connecting rail 10'.

Referring again to FIG. 11, body 54' of each connector tip $50_l'$ and $50_r'$ slopes upwardly relative to a horizontal line as such body 54' extends inwardly from the enlarged outer flange 52' thereof. The amount of such upward slope is indicated in FIG. 11 by the angle $\alpha$, which is the same angle $\alpha$ by which the corresponding weight plate $6_l'$ and $6_r'$ is inclined relative to vertical. This is due to the fact that the upward slopes of bodies 54' relative to horizontal necessarily set the angles of the weight plates $6_l'$ and $6_r'$ relative to vertical. Thus, when the connector tips 50' are received and fully seated within the first portions 46 of openings 40 in weight plates $6_l'$ and $6_r'$, the weight plates $6_l'$ and $6_r'$ will automatically be inclined relative to vertical in the desired manner for the alignment correction purposes described above.

As best shown in the transverse cross-section of FIG. 13, bodies 54' of connector tips $50_l'$ and $50_r'$ are not entirely cylindrical around the 360° exterior thereof as was true of bodies 54 of connector tips 50. However, each body 54' retains its cylindrical shape and its original diameter $d_4$ from FIG. 5 over an angular arc extending between points a and b in FIG. 13. This angular arc is substantially the same as that of the circumferential length of the first portion 46 of opening 46.

Figure 6:
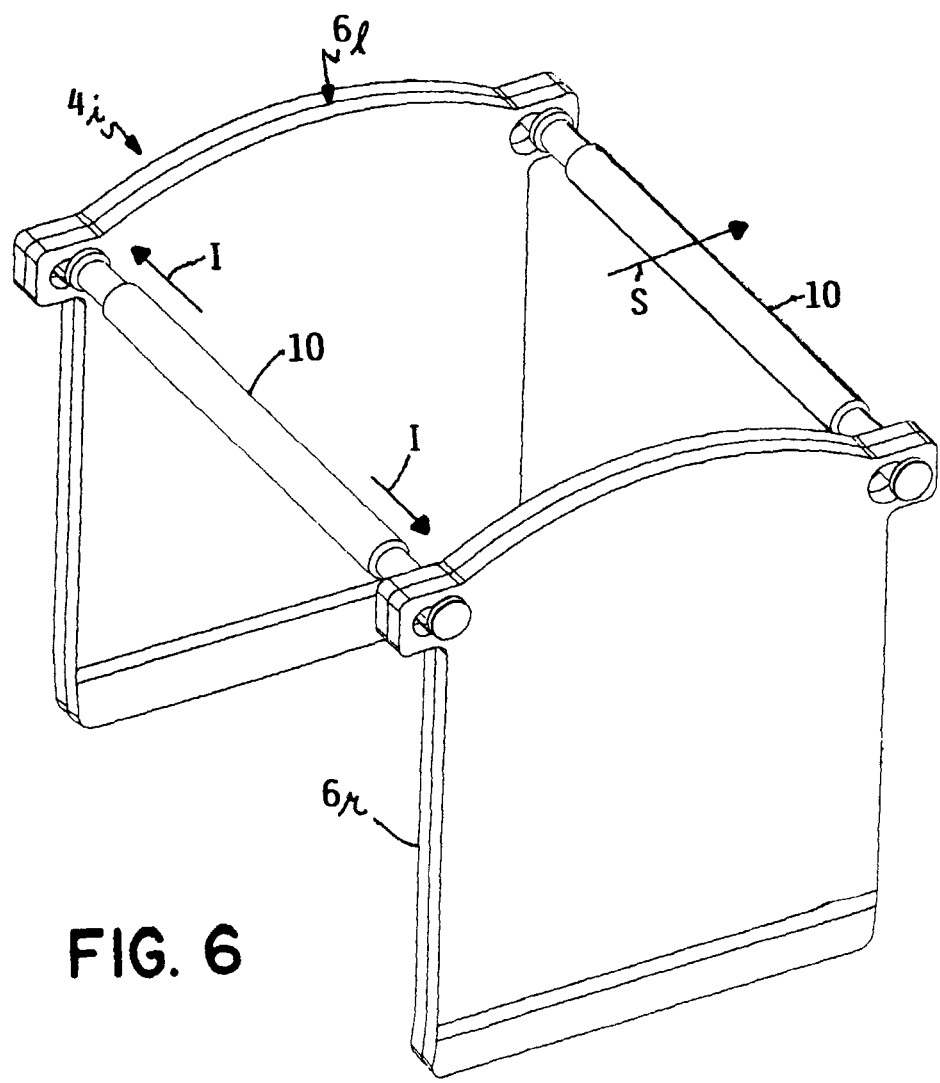
FIG. 6 is a perspective view of the exercise weight of FIG. 2, particularly illustrating the rear connecting rail in a fully assembled state within the keyhole slot connectors on the rear sides of the weight plates but with the front connecting rail being in a partially assembled state within the keyhole slot connectors on the front sides of the weight plates.

Thus, when tips $50_l'$ or $50_r'$ are slid outwardly in the direction of arrow S in FIG. 6 to install connecting rail 10' to weight plates $6_l'$ and $6_r'$, the cylindrical portion of body 54' that remains, which body 54' is still made of the compressible elastomeric material described previously herein, will compress within the reduced diameter $d_2$ of first portion 46 of opening 40 to develop a retention force that securely affixes connecting rail 10' to weight plates $6_l'$ and $6_r'$.

This force and the degree to which the cylindrical portion of body 54' interacts with first portion of opening 40 is substantially identical to what happens with the connector tips 50 shown in FIGS. 1-6. This is true since the angular extent of the cylindrical portion of body 54' between points a and b in FIG. 13 is substantially the same as that portion of the angular extent of the entirely cylindrical body 54 of connector tip 50 that actually comes into contact with the surface defining the reduced diameter portion 46 of opening 40.

The remaining portion of body 54' of tips $50_l'$ or $50_r'$ is formed as a thickened, somewhat square rib 68 that extends radially outwardly to one side of the cylindrical portion of body 54'. Rib 68 has an arcuate side surface 70 that conforms with and matches to the diameter of flanges 52' and 64 so that rib 68 does not extend radially outside of flange 52' and 64. Rib 68 is integrally formed with body 54' and with flanges 52' and 64 so that tips $50_l'$ or $50_r'$ are integral, one-piece units. The purpose of rib 68 is to reinforce flanges 52' and 64 to resist any tendency for such flanges 52' and 64 to fold over or deform during tip installation or use of dumbbell 2. If so desired, rib 68 could be provided in a similar place along body 54 and joined with flange 52 of the connector tips 50 shown in FIGS. 1-6 for reinforcement purposes even though such connector tips 50 do not provide the angled orientations of weight plates $6_l$ and $6_r$ that result from using connector tips $50_l'$ or $50_r'$.

Traditionally, dumbbell 2 as disclosed herein is used for anaerobic weight training to build strength. While this is useful and needed for health maintenance and vitality, another equally important aspect of exercise is aerobic training. In aerobic training, one does a movement type of exercise at a rate and for a period of time that elevates one's heart rate and maintains the heart rate at an elevated level. The maintenance of the heart rate at an elevated level can be for a relatively long continuous period of time, such as when a person runs, swims, climbs, or performs some other continuous movement over a significant time duration without stopping. The maintenance of the heart rate at an elevated level can be in shorter and more intense bursts of the type known as interval training. Regardless of how one performs aerobic exercise, such exercise gives cardiovascular benefits to the heart and circulatory system which are not provided by anaerobic strength training alone. The best exercise regime is commonly considered to be one in which a person does both aerobic and anaerobic training, either during one workout or perhaps in separate workouts dedicated to each.

Figure 15:
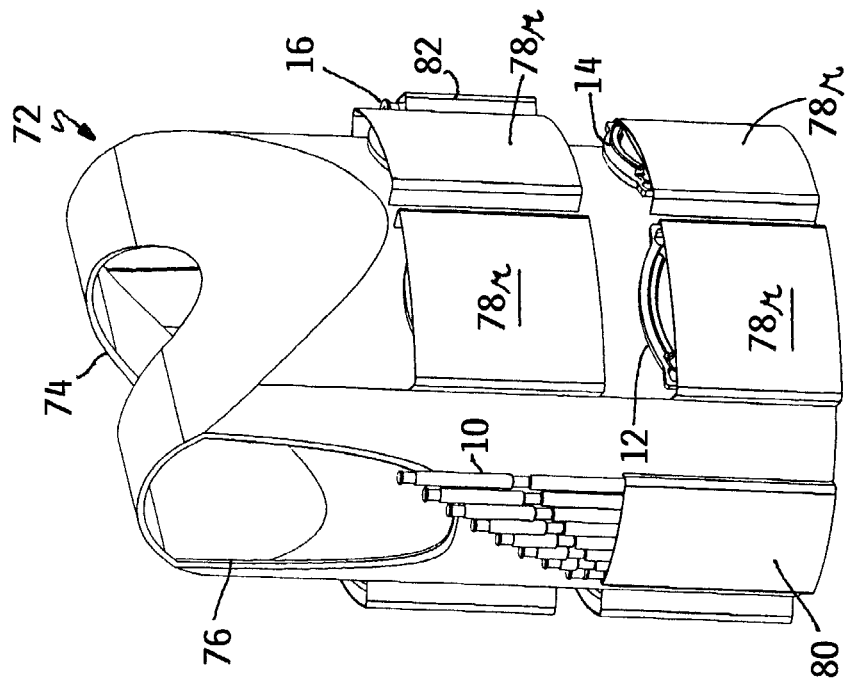
FIG. 15 is rear elevation view of the exercise vest of FIG. 14.
Figure 14:
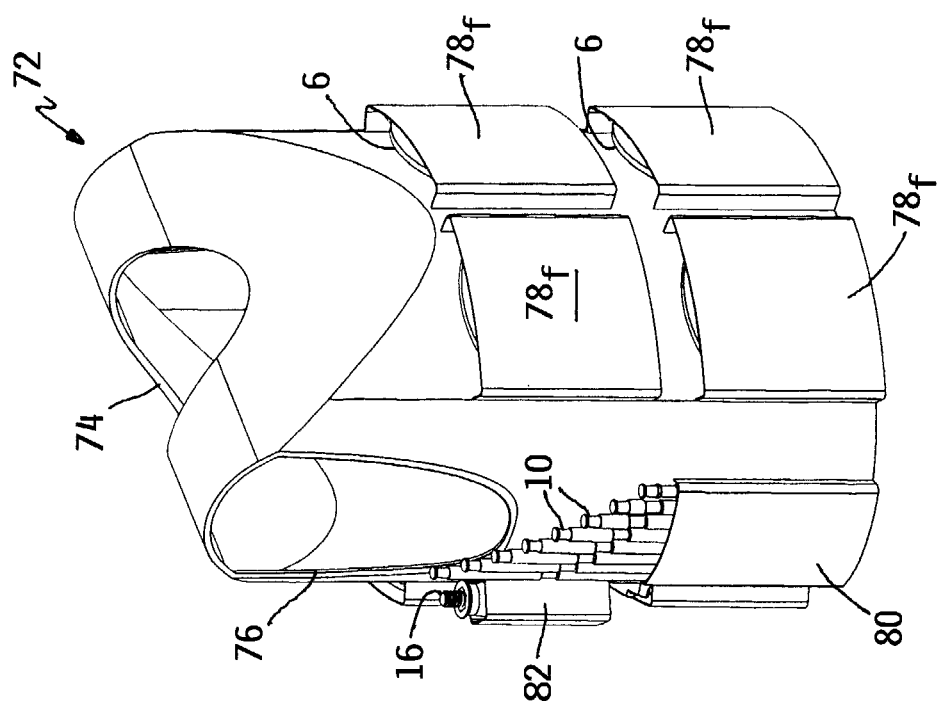
FIG. 14 is a front perspective view of an exercise vest that can be worn by a user, the vest having a plurality of storage pockets that can store the component parts of the dumbbell of FIG. 1 when such dumbbell is disassembled to allow a user to transport the dumbbell from place to place while obtaining the aerobic exercise benefit of carrying the weight of the dumbbell on the user's body while permitting reassembly of the dumbbell when so desired for anaerobic strength training.

The ability to easily knock down or disassemble the component parts of dumbbell 2 extends the use of dumbbell 2 for providing both anaerobic and aerobic training. Referring to FIGS. 14 and 15, an auxiliary component of this invention is a piece of clothing in the form of a jacket or vest 72. The vest can be a simple unitary piece of clothing having a hole 74 for the user's head and holes 76 for the user's arms so that vest 72 can simply be slipped on over the user's head with the user extending his or her arms through arm holes 76. Alternatively, the front of vest 72 could come apart to ease the task of putting on and removing vest 72 with conventional garment fasteners, such as buttons or zippers, being used to close vest 72 once it has been put on by the user. The material of vest 72 could be any type of material suitable for use in clothing.

FIG. 14 shows the front and one side of vest 72. Vest 72 is provided with a plurality of front pockets 78$_f$ that are shaped to hold the left and right weight plates 6$_l$ and 6$_r$ after dumbbell 2 is disassembled into its component parts. While only one weight plate 6 is shown in each of the four front pockets 78$_f$, such pockets 78$_f$ would each be sized to hold a plurality of weight plates 6. In addition, the rear of vest 72 as shown in FIG. 15 similarly has four rear pockets 78r. The upper two rear pockets 78$_r$ could hold additional ones of weight plates 6. Thus, front pockets 78$_f$ and the two upper rear pockets 78$_r$ would collectively be sized to hold all of the disassembled weight plates 6$_l$ and 6$_r$ when weight plates 6 are evenly distributed between the pockets. The two lower rear pockets 78$_r$ are sized to hold the left and right handle ends 12 and 14, one handle end 12 or 14 being placed in each lower rear pocket 78$_r$. In addition, the capacity of pockets 78 is great enough that selector 22 can be slipped into and retained in one of the pockets 78 adjacent to the weight plates 6 or handle ends 12 or 14 carried in such pocket.

Referring further to FIGS. 14 and 15, opposite sides of vest 72 include side pockets 80 for storing rails 10 of dumbbell 2 therein. One group of rails 10 can be stored in a side pocket 80 of the left side of vest 72 and the remaining rails 10 can be stored in a side pocket 80 on the right side of vest 71. In addition, one side of vest 72 includes a second side pocket 82 for storing hand grip 16 of handle 8. Pockets 78, 80 and 82 could be left open at the top as shown in FIGS. 14 and 15 with the depth of the pockets being sufficient to securely retain the dumbbell components stored therein. Alternatively, pockets 78, 80 and 82 could be provided with some type of closure flap or securement straps that would help retain the dumbbell components therein. Moreover, while pockets 78, 80 and 82 have been shown as being provided on a vest 72 worn on the user's torso, at least some of these pockets or additional pockets could be provided on the thigh portions of a pair of pants or shorts (not shown) that are also worn by the user.

Vest 72 allows dumbbell 2 to be used in a new way in support of aerobic exercise as well as anaerobic strength training. It allows all of the components needed for dumbbell 2 to work in an anaerobic way, namely the handle ends 12 and 14 and hand grip 16 that comprise handle 8, the selector 22, and the rails 10 and weight plates 6 that can be assembled into the nested weights 4 having stacks of nested left and right weight plates 6$_l$ and 6$_r$, to be carried on the user's body as the user walks or jogs in an aerobic manner. The added mass of dumbbell 2 carried on the user's body greatly increases the aerobic effort required from the user while giving the user the opportunity to get such aerobic exercise outdoors. If desired, the user can carry fewer rails 10 and their corresponding weight plates 6 while leaving the rest of rails 10 and their corresponding weight plates behind if the user wishes to carry less than the full weight of dumbbell 2.

However, regardless of whether the user carries all of the weight of dumbbell 2 in vest 72 or only a portion of the weight, as some point the user may desire to shift from aerobic exercise to anaerobic strength training. The user can then simply stop the aerobic exercise, remove from vest 72 the handle components 12, 14 and 16, the selector 16, and as many of the rails 10 and their corresponding weight plates 6 as the user desires to use during the anaerobic exercise, and then quickly and easily assemble dumbbell 2. The user can then use dumbbell in its normal manner, positioning selector 22 to pick up different amounts of the weights 4 dependent upon where selector 22 is inserted into handle 8, to exercise in an anaerobic manner. Once the user has had enough anaerobic exercise, the user can then quickly and easily reassemble dumbbell 2 and restore the component parts thereof in vest 72 to resume aerobic exercise or to return home if the user has been exercising outdoors. The knock down capability of dumbbell 2 along with vest 72 permits a user to exercise in an entirely new way for obtaining both aerobic and anaerobic benefits.

Figure 16:
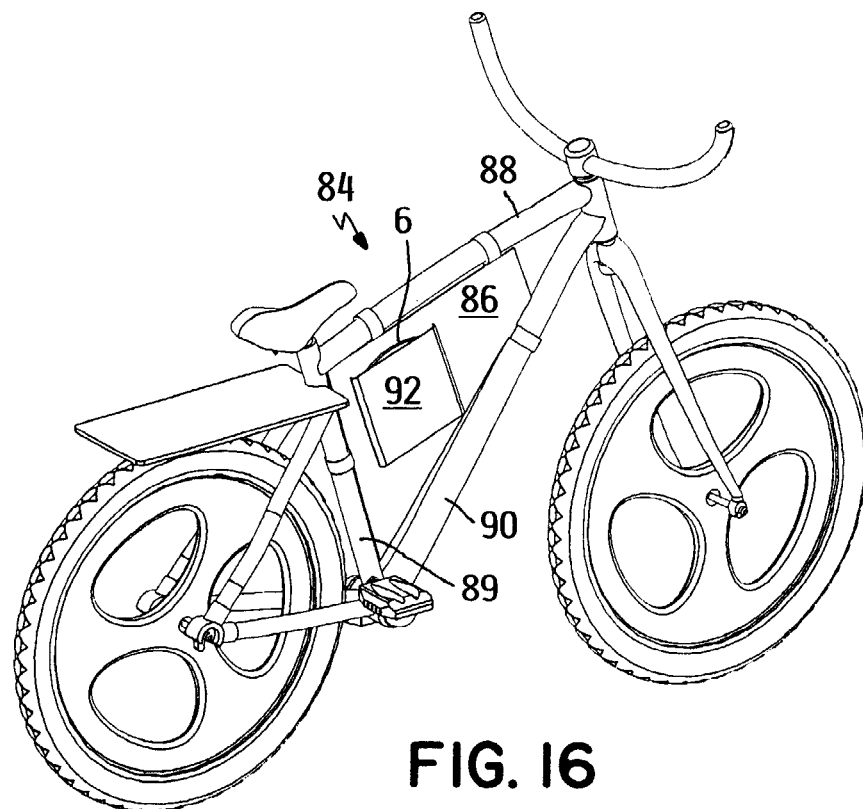
FIG. 16 is a perspective view of a first embodiment of a bicycle having a center carrier with pockets for carrying a plurality of the weight plates of the weights of the dumbbell of FIG. 1 when such dumbbell is disassembled into its component parts.

Referring now to FIG. 16, a bicycle 84 is provided with a center carrier 86 that is strapped or otherwise mounted to the frame of bicycle 84 between top tube 88, seat tube 89, and down tube 90. Carrier 86 is preferably, but not necessarily, made of a fairly stiff material such as a hard plastic material or the like. Each side of carrier 86 includes at least one pocket 92 into which one or more weight plates 6 of dumbbell 2 may be slipped for adding mass to bicycle 84 when the user is pedaling the bicycle, to thereby increase the mass the user must move to increase the aerobic benefit in riding bicycle 84. Only the right pocket 92 is visible in FIG. 16 with left pocket 92 being hidden by carrier 86. This allows at least the weight plates 6 of a disassembled dumbbell to be used in a user powered movable vehicle, such as bicycle 84 but not limited to a bicycle, for obtaining increased aerobic benefit from the user having to power the vehicle.

Figure 17:
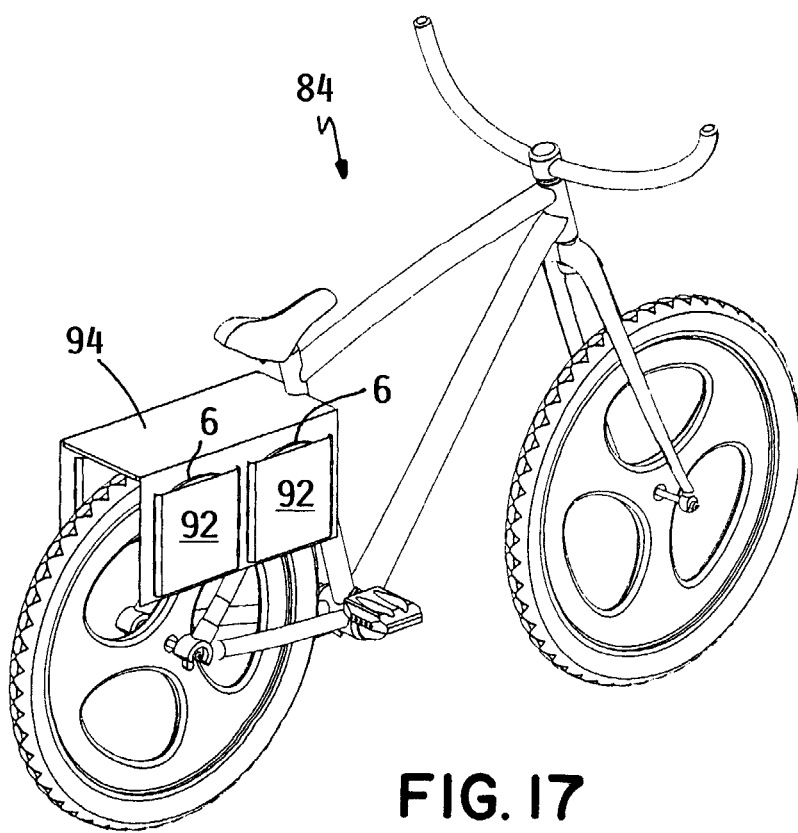
FIG. 17 is a perspective view of a second embodiment of a bicycle having a saddle bag type carrier with pockets for carrying a plurality of the weight plates of the weights of the dumbbell of FIG. 1 when such dumbbell is disassembled into its component parts.

In FIG. 17, bicycle 84 utilizes a rear pannier or saddle-bag type carrier 94 having a pair of pockets 92 on each of the left and right sides of the frame of bicycle 84, for a total of four pockets 92, to increase the weight carrying capacity of the carrier as compared to carrier 86. Pockets 92 on opposite sides of carrier 94 are meant to be spaced and held substantially equally apart from the left and right sides of the bicycle frame to balance the additional load added to bicycle 84.

In addition, selectorized dumbbell 2 of this invention provides the manufacturer with the ability to cost effectively provide dumbbells 2 of different lengths to suit customers having different hand sizes. It is important to a particular user to have a dumbbell that is appropriate to the user's hand size to thereby keep the weight plates 6 that are carried outboard of the ends of handle 8 as close to the user's hand as possible. This tailored approach to the manufacture of dumbbells has not been economically possible in the past. Thus, the length of the hand grip 16 of handle 8 has necessarily been made in a single size that large users may find to be too small and that small users may find to be too large.

With dumbbell 2, the weight plate 6 and handle ends 12 and 14 would be common components in every dumbbell, thus leading to manufacturing and cost efficiencies. The only thing that would change in making a length tailored dumbbell would be the length of hand grip 16, the lengths of some of the rails 10, and the width of selector 22. It would be economically possible to stock this latter group of length dependent components in various sizes.

Thus, if an order were received for a dumbbell 2 having a four inch hand grip 16, then the manufacturer would merely package such a four inch sized hand grip 16 with the common left and right handle ends 12 and 14 that attach to hand grip 16, would package a set of rails 10 having one or two shorter rails in place of the one or two longest rails 10 in a standard set of rails 10 with the common weight plates 6 that are used regardless of the rail length, and would finish the packaging with a four inch wide selector 22 that is sized to fit into handle ends 12 and 14 when such handle ends 12 and 14 are joined together by a four inch sized hand grip 12. This custom packaging of components would be as simple to do as picking the appropriate components out of bins of the same to package the correctly sized components needed to meet the request for a dumbbell 2 having a four inch long handgrip. If the request were for a dumbbell having a five or six inch long hand grip, the same weight plates 6 and handle ends 12 and 14 could be used as in a four inch set. However, these common components would simply be packaged with a hand grip 16 of the requested length, a selector 22 having a corresponding width, and a set of rails 10 having the right lengths. The ability to provide individualized selectorized dumbbells 2 that are, in effect, custom made for a particular user without excessive cost is one further advance provided by this invention.

Finally, while the preferred embodiment of dumbbell 2 comprises an interference fit arising between a larger outer diameter $d_4$ portion of shaped rail end 44 received in the smaller inner diameter $d_2$ of second portion 48 of opening 40, an interference fit is not required and could be dispensed with in favor of a non-interference or loose fit. For example, the outer diameter $d_4$ portion of shaped rail end 44 could be smaller, e.g. 5 to 10 thousandths of an inch smaller than the inner diameter $d_2$ of second portion 48 of opening 40, to create a loose fit between the two. This would make it very easy to assemble rail ends 44 into openings 40 since pulling or pushing outwardly on rail ends 44 in securement direction S would require less force. However, at first blush, this would seem to suggest that rail ends 44 would not remain secured to openings 40 during use or storage of dumbbell 2. This is not the case as will now be explained with reference to FIGS. 18 and 19.

FIG. 18 is a cross-sectional view through FIG. 8 showing dumbbell 2 with the user having coupled the three innermost weights 4 to handle 8 by sliding selector 22 into handle 8 in a position where it picks up the lowermost rails 10 of the outermost of the three weights 4. The six other unused weights 4 are shown remaining in their stacked nested configuration. FIG. 18 depicts handle 8 and the three coupled weights 4 as having been lifted upwardly out of the weight stack for use by a user in performing dumbbell type exercises.

In looking at the three coupled weights 4 that are carried by handle 8, the front and rear sides 13 and 15 of each of the handle ends 12 and 14 form backing or stop surfaces that are inwardly of but close enough to each of the front and rear rails 10 of weights 4 carried on handle 8 to physically prevent such rails 10 from moving inwardly far enough to disengage with second portion 48 of opening 40. Thus, even with a loose fit between rails 10 and second portions 48 of the openings 40 in which they are received, the front and rear sides 13 and 15 of the handle ends prevent rails 10 from detaching or disassembling themselves from weight plates $6_l$ and $6_r$ comprising each weight 4 during use of dumbbell 2. Thus, the terms "secure" or "securement" as used herein to describe the connection between each rail 10 and weight plates $6_l$ and $6_r$ are intended to cover both a non-interference fit as well as a loose fit unless such connection is specifically claimed as a non-interference fit or a loose fit.

Turning now to FIG. 19, any weights 4 remaining in their nested stacked configuration while handle 8 and its coupled weights 4 are being used for exercise will also not disassemble themselves. As shown in FIG. 19, for each of the outermost weights 4 that remain in the stack, the front and rear sides $11_f$ and $11_r$ of weight plates 6, which are similar in shape and extent to the front and rear sides 13 and 15 of left and right handle ends 12 and 14, will closely back rails 10 in stacked weights 4 to prevent their disengagement from openings 40. See also FIG. 18. For example, referring to outermost weight $4_o$ in FIG. 19, it is clear that rails 10 on outermost weight $4_o$, which rails 10 are the lowermost and longest rails 10 in array of rails 10 in the remaining stack of weights, are backed by the front and rear sides $11_f$ and $11_r$ of weight plates 6 of all the weights 4 that lie interiorly of outermost weight $4_o$. Similarly, as one goes up the array of rails 10 shown in FIG. 19 within the remaining stack, all of the rails 10 of each of the remaining weights 4, except for the very innermost weight 4, are backed by the closely spaced front and rear sides $11_f$ and $11_r$ of one or more weight plates 6. This physical stop provided by the front and rear sides $11_f$ and $11_r$ of weight plates 6 will prevent the rails 10 from being pushed inwardly far enough to disengage from second portions 48 of openings 40 in weights 4 in much the same manner as is true of the front and rear sides 13 and 15 of left and right handle ends 12 and 14 in relation to those weights 4 that are carried by handle 8.

As to the very innermost weight 4 shown in the remaining stack of nested weights 4 in FIG. 19, there is no other weight 4 lying inside of such innermost weight 4 whose weight plates 6 can back rails 10 of such innermost weight 4, which rails 10 are the uppermost rails shown in FIG. 19. However, such rails 10 will still not be capable of being pushed inwardly and out of second portion 48 of opening 40 because the enlarged head 52 of the shaped rail end 44 of such weight physically overlies a portion of the weight plates 6 of the adjacent weight to the outside of the innermost weight 4. This overlying placement of the ends of rails 10 of innermost weight 4 across at least a portion of the weight plates 6 of the next outside weight 4 will not allow rails 10 to disengage if a person should inadvertently strike or hit such rails 10 in a direction that might otherwise disengage them, even in the absence of any weight plates 6 to the inside thereof.

Since dumbbell 2 functions normally even with a loose fit between rails 10 and the second portions 48 of openings 40 as noted above, this would permit dumbbell embodiments in which rails 10 could be made simply of steel without using compressible tips 50 and without having to fashion an interference fit that is tight enough to normally hold rails 10 non-movably in place during use of dumbbell 2. This would lead to the possibility of having a less expensive version of dumbbell 2 for sale, thereby allowing a premium dumbbell embodiment using compressible tips 50 with an interference fit and a more basic dumbbell embodiment using simple steel rails with a loose fit. The more basic dumbbell embodiment would also lead to more opportunities to source components from multiple sources around the world to give the manufacturer more flexibility in where the product would be manufactured and in achieving better component pricing.

Various modifications of this invention will be apparent to those skilled in the art. While a keyhole slot configuration for opening 40 and the cooperating shaped rail end 44 is preferred, it is not the only type of configuration that could be used to permit tool free assembly and disassembly. Other forms of openings could be used that could comprise rotary motions as well as linear motions of the parts to assemble or disassemble.

Moreover, rather than using a pair of front and rear rails 10 to join the left and right weight plates $6_l$ and $6_r$, a single, shallow, channel shaped connecting member 10 connecting a central area of the bottom of each of the left and right weight plates $6_l$ and $6_r$ could have been used. Such single connection members would be horizontally nested together inside one another in a vertically compact manner beneath hand grip 16 with a different type of selector 22 being used, namely a connecting pin that is horizontally movable into received in one of a plurality of sets of horizontally spaced, uniquely shaped, sets of holes and slots provided the connection members, as also shown in the '735 patent incorporated by reference herein. In this single connecting member setup, the keyhole slot connection would be used at each end of the single connecting member and the bottoms of each of the left and right weight plates.

Various other modifications of this invention will be apparent to those skilled in the art. Thus, the scope of this invention is not to be limited by the details of the description of the embodiment of dumbbell 2 disclosed herein, but only by the appended claims.

The invention claimed is:

1. A method of providing a selectorized dumbbell in custom made lengths:
   (a) providing a selectorized dumbbell which comprises:
      (i) a plurality of nested exercise weights, each weight in the plurality of weights comprising left and right weight plates which are spaced apart from one another but which are joined to one another to form a single weight by at least one interconnecting member extending between and being attached to the weight plates, the weight plates and the at least one interconnecting member of each weight being separate and distinct from the weight plates and the at least one interconnecting member of the other weights, and each weight having a releasable connection between each of the left and right weight plates and opposite ends of the at least one interconnecting member for attaching the left and right weight plates to the at least one interconnecting member to permit the weights to be disassembled into a plurality of weight plates and interconnecting members that are capable of being disconnected from one another;
      (ii) a handle comprising a hand grip releasably connecting left and right handle ends to permit the handle to be disassembled into disconnected handle ends and hand grip;
      (iii) a selector that is adjustable on the handle to couple different numbers of exercise weights to the handle to vary the exercise mass provided by the dumbbell; and
   (b) providing dumbbells of different lengths having weight plates and handle ends that are common to each dumbbell but also having hand grip lengths, selector widths and sets of interconnecting members that are unique to each dumbbell according to the length of each dumbbell.

* * * * *